United States Patent
Tanaka

(10) Patent No.: US 11,801,714 B2
(45) Date of Patent: Oct. 31, 2023

(54) HEAVY DUTY PNEUMATIC TIRE

(71) Applicant: SUMITOMO RUBBER INDUSTRIES, LTD., Kobe (JP)

(72) Inventor: Satoshi Tanaka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 491 days.

(21) Appl. No.: 16/938,531

(22) Filed: Jul. 24, 2020

(65) Prior Publication Data
US 2021/0023887 A1 Jan. 28, 2021

(30) Foreign Application Priority Data
Jul. 26, 2019 (JP) .................. 2019-137936

(51) Int. Cl.
| | |
|---|---|
| *B60C 11/01* | (2006.01) |
| *B60C 11/00* | (2006.01) |
| *B60C 9/28* | (2006.01) |
| *B60C 11/03* | (2006.01) |

(52) U.S. Cl.
CPC .............. *B60C 11/01* (2013.01); *B60C 9/28* (2013.01); *B60C 11/0058* (2013.01); *B60C 11/0083* (2013.01); *B60C 2011/016* (2013.01); *B60C 2011/0348* (2013.01); *B60C 2200/06* (2013.01)

(58) Field of Classification Search
CPC . B60C 11/01; B60C 11/0083; B60C 11/0058; B60C 2011/016; B60C 2011/0348; B60C 2200/06
See application file for complete search history.

(56) References Cited

U.S. PATENT DOCUMENTS

| | | | | |
|---|---|---|---|---|
| 5,833,780 A | * | 11/1998 | Kishi ................... | B60C 11/1384 152/209.15 |
| 2003/0005992 A1 | | 1/2003 | Radulescu | |
| 2009/0107597 A1 | * | 4/2009 | Loewenhaupt ......... | B60C 11/00 152/209.5 |
| 2010/0065174 A1 | * | 3/2010 | Matsunaga ............. | B60C 11/01 152/209.14 |
| 2013/0220500 A1 | * | 8/2013 | Okabe ................... | B60C 1/0016 152/209.1 |
| 2014/0345776 A1 | * | 11/2014 | Takada .................... | B60C 11/01 152/538 |
| 2017/0001476 A1 | * | 1/2017 | Bourgeois ........... | B60C 11/0066 |

FOREIGN PATENT DOCUMENTS

| | | | | | |
|---|---|---|---|---|---|
| JP | 58211902 A | * | 12/1983 | ......... | B60C 11/0058 |
| JP | 2002-512575 A | | 4/2002 | | |
| KR | 100217207 B1 | * | 9/1999 | ............... | C08K 3/36 |

* cited by examiner

*Primary Examiner* — Justin R Fischer
*Assistant Examiner* — Philip N Schwartz
(74) *Attorney, Agent, or Firm* — Birch, Stewart, Kolasch & Birch, LLP

(57) ABSTRACT

In a tire 12, a tread 14 includes a tread main body 44 and edge portions 46. A wear resistance index of each edge portion 46 obtained according to JIS K6264-2 is higher than that of the tread main body 44. An outer surface S of the tire 12 includes a tread surface ST, a pair of shoulder surfaces SH connected to the tread surface ST, and a pair of side surfaces SW connected to the shoulder surfaces SH. Each shoulder surface SH includes an outer surface formed by the edge portion 46, and a contour of each shoulder surface SH is represented by a circular arc having a center at an inner side.

16 Claims, 5 Drawing Sheets

(a)

(b)

HEAVY DUTY PNEUMATIC TIRE

TECHNICAL FIELD

The present invention relates to heavy duty pneumatic tires.

BACKGROUND ART

Due to running, the tread of a tire is worn. The wear not only affects the appearance of the tire, but also affects the running performance and durability of the tire, since the uneven wear changes the contact pressure distribution of the tire. Therefore, various studies have been conducted in order to improve wear resistance (for example, PATENT LITERATURE 1 below).

FIG. 5 shows schematic diagrams of a trailer 2. The number of axles provided on the trailer 2 is normally two. Although not shown, two tires T are mounted to each of the right and left of each of the axles at the front side and the rear side.

The trailer 2 is loaded with luggage or the like on a platform thereof and runs while being towed by a towing vehicle (not shown). A large load acts on the tires T mounted on the trailer 2. Lateral force acts on the tires T during lane change or cornering. Moreover, the running distance of the trailer 2 is long. Therefore, also for the tires T, similar to tires mounted on a truck, a bus, and the like, wear resistance is one of the important performance characteristics.

The trailer 2 shown in FIG. 5(a) is a tandem type trailer 2a having a short distance between axles. The trailer 2 is generally used as this tandem type.

The trailer 2 shown in FIG. 5(b) is a spread type trailer 2b. In the trailer 2b, the front axle is disposed further forward than the front axle of the tandem type. The distance between the axles of the trailer 2b is longer than the distance between the axles of the tandem type trailer 2a. The use of the spread type tends to increase in order to increase the load weight per axle.

CITATION LIST

Patent Literature

PATENT LITERATURE 1: Japanese Translation of PCT International Application Publication No. 2002-512575

SUMMARY OF INVENTION

Technical Problem

As described above, in the spread type trailer 2b, the front axle is disposed further forward than the front axle in the tandem type. Therefore, the direction, magnitude, etc., of the force acting on each tire T mounted on the front axle may change, and there is a concern that wear that has not been confirmed in the tandem type trailer 2a may occur. In particular, it is expected that large lateral force will act on the shoulder portions of the tires T located outward in the width direction of the vehicle, and, depending on the magnitude of the lateral force, the shoulder portions may be worn away in a hangnail shape.

The present invention has been made in view of the above circumstances, and an object of the present invention is to provide a heavy duty pneumatic tire in which improvement of wear resistance is achieved.

Solution to Problem

A heavy duty pneumatic tire according to an aspect of the present invention includes: a tread that comes into contact with a road surface; a pair of sidewalls connected to the tread; and a belt located radially inward of the tread. In the tire, at least four circumferential grooves are formed on the tread, thereby forming at least five land portions aligned in an axial direction, and, among these land portions, a land portion located on an equator plane or at the equator plane side is a center land portion, land portions located at outermost sides in the axial direction are shoulder land portions, and land portions located between the center land portion and the shoulder land portions are middle land portions. The belt includes a plurality of layers stacked in a radial direction, and, among these layers, a layer having a largest width in the axial direction is a first reference layer, and a layer stacked at an outer side of the first reference layer is a second reference layer, each end of the second reference layer being located inward of an end of the first reference layer in the axial direction. The tread includes a tread main body and edge portions located axially outward of the tread main body. A wear resistance index of each edge portion obtained according to JIS K6264-2 is higher than that of the tread main body. An outer surface of the tire includes a tread surface, a pair of shoulder surfaces connected to the tread surface, and a pair of side surfaces connected to the shoulder surfaces. Each shoulder surface includes an outer surface formed by the edge portion, and a contour of each shoulder surface is represented by a circular arc having a center at an inner side.

Preferably, in the heavy duty pneumatic tire, a boundary between the tread main body and each edge portion on the outer surface of the tire is located inward of the end of the first reference layer in the axial direction, and an extension line of the first reference layer intersects an outer surface of the sidewall.

Preferably, in the heavy duty pneumatic tire, a thickness of each edge portion at the shoulder surface is not less than 4% and not greater than 8% of a half width of the tread.

Preferably, in the heavy duty pneumatic tire, a boundary between the tread surface and each shoulder surface is located inward of the end of the second reference layer in the axial direction.

Preferably, in the heavy duty pneumatic tire, a contour of the tread surface includes a circular arc having a center on the equator plane, and the circular arc is a reference circular arc. A ratio of a radius of the circular arc representing the contour of the shoulder surface, to a radius of the reference circular arc, is not less than 1/30 and not greater than 1/15.

Preferably, in the heavy duty pneumatic tire, the end of the second reference layer is located outward of a center of the shoulder land portion in the axial direction.

Preferably, in the heavy duty pneumatic tire, a ratio of the wear resistance index of each edge portion to the wear resistance index of the tread main body is not less than 150% and not greater than 200%.

Preferably, in the heavy duty pneumatic tire, a circumferential narrow groove is formed on each middle land portion, and a distance in the axial direction from an outer edge of the middle land portion to a center of the circumferential narrow groove is not less than 10% and not greater than 20% of a width in the axial direction of the middle land portion.

More preferably, in the heavy duty pneumatic tire, a width of the circumferential narrow groove is not less than 3% and not greater than 6% of the width in the axial direction of the middle land portion.

More preferably, in the heavy duty pneumatic tire, among the circumferential grooves, circumferential grooves located at outermost sides in the axial direction are shoulder circumferential grooves, and a depth of the circumferential narrow groove is not less than 40% and not greater than 80% of a depth of the shoulder circumferential groove.

Preferably, in the heavy duty pneumatic tire, each middle land portion includes a middle land portion main body and a reinforcement portion stacked on the middle land portion main body. The reinforcement portion includes an outer edge of the middle land portion. A ratio of a width in the axial direction of the reinforcement portion to a width in the axial direction of the middle land portion is not less than 1/4 and not greater than 1/2, and a wear resistance index of the reinforcement portion obtained according to JIS K6264-2 is equal to that of the edge portion.

More preferably, in the heavy duty pneumatic tire, among the circumferential grooves, circumferential grooves located at outermost sides in the axial direction are shoulder circumferential grooves, and a thickness of the reinforcement portion is not less than 40% and not greater than 80% of a depth of the shoulder circumferential groove.

Advantageous Effects of Invention

In the heavy duty pneumatic tire according to the present invention, improvement of wear resistance is achieved.

DESCRIPTION OF EMBODIMENTS

The following will describe in detail the present invention based on preferred embodiments with appropriate reference to the drawings.

In the present invention, a state where a tire is mounted on a normal rim, the internal pressure of the tire is adjusted to a normal internal pressure, and no load is applied to the tire is referred to as a normal state. In the present invention, unless otherwise specified, the dimensions and angles of each component of the tire are measured in the normal state.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

Figure 1:
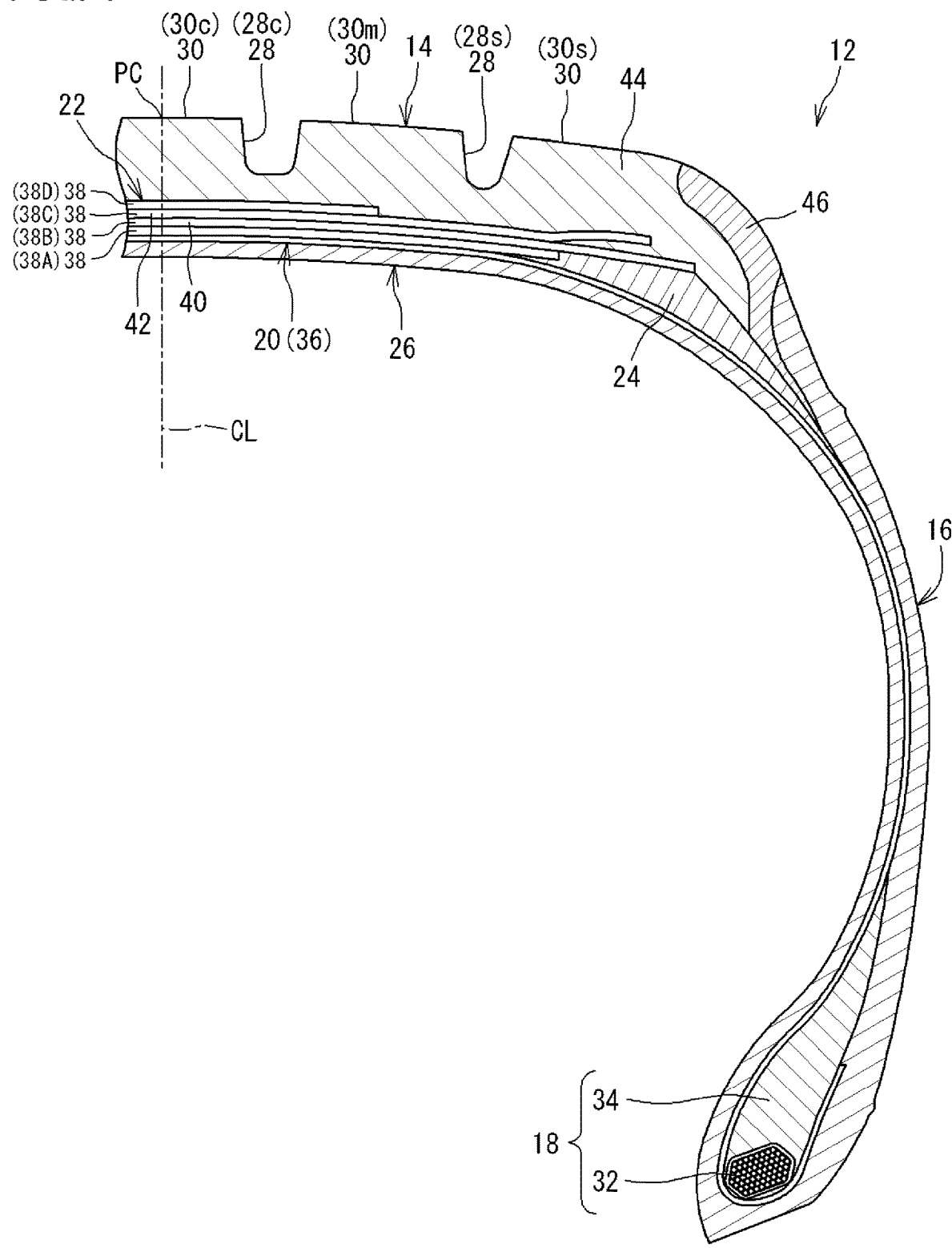
FIG. 1 is a cross-sectional view showing a part of a heavy duty pneumatic tire according to an embodiment of the present invention.

FIG. 1 shows a part of a heavy duty pneumatic tire 12 (hereinafter, sometimes referred to simply as "tire 12") according to an embodiment of the present invention. The tire 12 is mounted to a towed vehicle such as the above-described trailer 2. The tire 12 is also referred to as a tire for a towed vehicle.

FIG. 1 shows a part of a cross-section of the tire 12 along a plane including the rotation axis of the tire 12. In FIG. 1, the right-left direction is the axial direction of the tire 12, and the up-down direction is the radial direction of the tire 12. The direction perpendicular to the surface of the sheet of FIG. 1 is the circumferential direction of the tire 12. In FIG. 1, an alternate long and short dash line CL represents the equator plane of the tire 12.

The tire 12 includes a tread 14, a pair of sidewalls 16, a pair of beads 18, a carcass 20, a belt 22, a pair of cushion layers 24, and an inner liner 26.

The tread 14 comes into contact with a road surface at the outer surface thereof. The tread 14 is formed from a cross-linked rubber. In FIG. 1, reference character PC represents the point of intersection of the outer surface of the tread 14 and the equator plane CL. The point of intersection PC corresponds to the equator of the tire 12.

In the tire 12, at least four circumferential grooves 28 are formed on the tread 14. Accordingly, at least five land portions 30 are formed in the tread 14. In the tire 12 shown in FIG. 1, four circumferential grooves 28 are formed on the tread 14, and five land portions 30 are formed in the tread 14.

Among the four circumferential grooves 28, the circumferential grooves 28 located at the inner side in the axial direction, that is, the circumferential grooves 28 near the equator PC, are center circumferential grooves 28c. The circumferential grooves 28 located at the outermost sides in the axial direction are shoulder circumferential grooves 28s. In the case where the circumferential grooves 28 formed on the tread surface 14 include a circumferential groove located on the equator PC, the circumferential groove located on the equator PC is defined as a center circumferential groove. Moreover, in the case where a circumferential groove is present between each center circumferential groove 28c and each shoulder circumferential groove 28s, this circumferential groove is defined as a middle circumferential groove.

In the tire 12, from the viewpoint of contribution to drainage performance and traction performance, the width of each center circumferential groove 28c is preferably about 2 to 10% of a ground-contact surface width. The depth of each center circumferential groove 28c is preferably 8 to 25 mm. From the same viewpoint, the width of each shoulder circumferential groove 28s is preferably about 1 to 7% of the ground-contact surface width. The depth of each shoulder circumferential groove 28s is preferably 8 to 25 mm. The ground-contact surface width is represented by the width, in the axial direction, of a ground-contact surface obtained by applying the normal load to the tire 12 in the normal state and bringing the tread 14 into contact with a flat surface at a camber angle of 0°.

Among the five land portions 30, the land portion 30 located at the inner side in the axial direction, that is, the land portion 30 located on the equator PC, is a center land portion 30c. The land portions 30 located at the outermost sides in the axial direction are shoulder land portions 30s. Moreover, the land portions 30 located between the center land portion 30c and the shoulder land portions 30s are middle land portions 30m. In the case where, among the land portions 30 formed in the tread 14, the land portion located at the inner side in the axial direction is located not on the equator PC but near the equator PC, the land portion located near the equator PC, that is, the land portion located at the equator PC side, is defined as a center land portion.

In the tire 12, from the viewpoint of steering stability and wet performance, the width in the axial direction of the center land portion 30c is preferably about 10 to 18% of the width in the axial direction of the tread 14. From the same viewpoint, the width in the axial direction of each middle land portion 30m is preferably about 10 to 18% of the width in the axial direction of the tread 14.

Each sidewall 16 is connected to an end of the tread 14. The sidewall 16 extends radially inward from the end of the tread 14. The sidewall 16 is formed from a crosslinked rubber.

Each bead 18 is located radially inward of the sidewall 16. The bead 18 includes a core 32 and an apex 34. The core 32 includes a wound wire made of steel. The apex 34 is located radially outward of the core 32. The apex 34 is tapered outward. The apex 34 is formed from a crosslinked rubber having a high hardness.

The carcass 20 is located inward of the tread 14 and each sidewall 16. The carcass 20 includes at least one carcass ply 36. The carcass 20 of the tire 12 is composed of one carcass ply 36. In the tire 12, the carcass ply 36 is turned up around each core 32 from the inner side toward the outer side in the axial direction.

The carcass ply 36 includes a large number of carcass cords aligned with each other, which are not shown. The carcass cords are covered with a topping rubber. Each carcass cord intersects the equator plane CL. In the tire 12, the angle of each carcass cord relative to the equator plane CL is not less than 70° and not greater than 90°. The carcass 20 has a radial structure. In the tire 12, the material of the carcass cords is steel.

The belt 22 is located radially inward of the tread 14. The belt 22 is located radially outward of the carcass 20. The belt 22 includes a plurality of layers 38 stacked in the radial direction. The belt 22 of the tire 12 includes four layers 38. In the tire 12, the number of layers 38 forming the belt 22 is not particularly limited. The configuration of the belt 22 is determined as appropriate in consideration of the specifications of the tire 12.

Each of the layers 38 includes a large number of belt cords aligned with each other, which are not shown. The belt cords are covered with a topping rubber. The material of the belt cords is steel. The belt cords are tilted relative to the equator plane CL. In the tire 12, the belt 22 is formed such that the belt cords of one layer 38 intersect the belt cords of another layer 38 stacked on the one layer 38.

In the tire 12, among the four layers 38, a second layer 38B located between a first layer 38A and a third layer 38C has the maximum width in the axial direction. A fourth layer 38D located at the outermost side in the radial direction has the minimum width in the axial direction.

As shown in FIG. 1, among the four layers 38 forming the belt 22, ends of the first layer 38A, the second layer 38B, and the third layer 38C are located outward of the shoulder circumferential groove 28s in the axial direction. The end of the first layer 38A is located inward of the end of the third layer 38C in the axial direction. An end of the fourth layer 38D is located between the center circumferential groove 28c and the shoulder circumferential groove 28s in the axial direction.

In the tire 12, among the plurality of layers 38 forming the belt 22, the layer 38 having the largest width in the axial direction is also referred to as a first reference layer 40, and the layer 38 stacked at the outer side of the first reference layer 40 is also referred to as a second reference layer 42. In the tire 12, the second layer 38B having the largest width in the axial direction is the first reference layer 40, and the third layer 38C stacked at the outer side of the second layer 38B in the radial direction is the second reference layer 42. As shown in FIG. 1, the end of the second reference layer 42 is located inward of the end of the first reference layer 40 in the axial direction.

Each cushion layer 24 is located between the belt 22 and the carcass 20 at a portion of the belt 22 at an end thereof, that is, at an end portion of the belt 22. The cushion layer 24 is formed from a crosslinked rubber.

The inner liner 26 is located inward of the carcass 20. The inner liner 26 forms an inner surface of the tire 12. The inner liner 26 is formed from a crosslinked rubber that has an excellent air blocking property. The inner liner 26 maintains the internal pressure of the tire 12.

Figure 2:
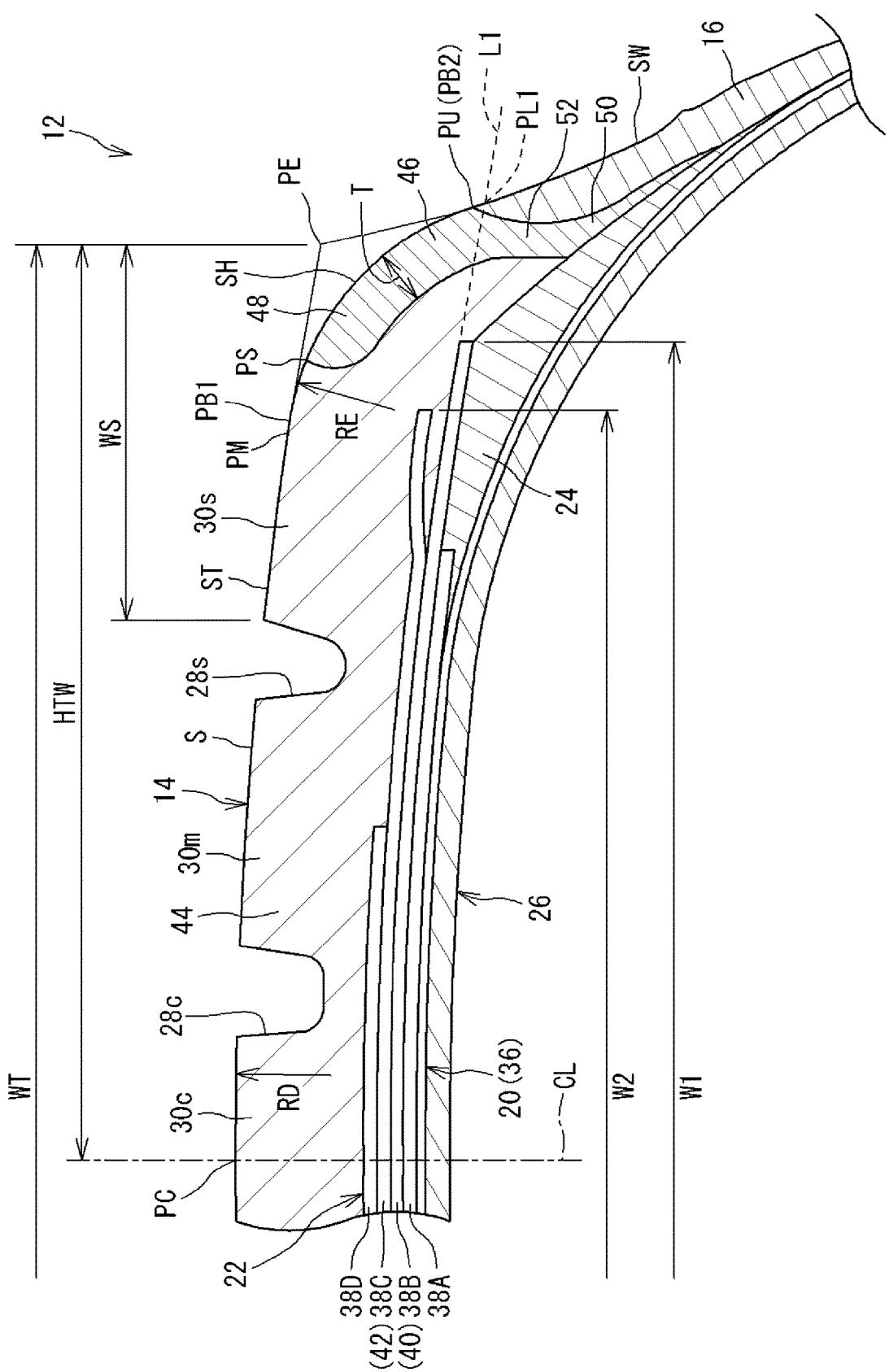
FIG. 2 is an enlarged cross-sectional view showing a tread portion of the tire in FIG. 1.

FIG. 2 shows a part of the cross-section of the tire 12 shown in FIG. 1. In FIG. 2, the right-left direction is the axial direction of the tire 12, and the up-down direction is the radial direction of the tire 12. The direction perpendicular to the surface of the sheet of FIG. 2 is the circumferential direction of the tire 12.

The tread 14 of the tire 12 includes a tread main body 44 and a pair of edge portions 46. In the tire 12, the tread main body 44 covers the entirety of the belt 22. Each edge portion 46 is located axially outward of the tread main body 44. The edge portion 46 is located between the tread main body 44 and the sidewall 16. In FIG. 2, reference character PS represents the boundary between the tread main body 44 and the edge portion 46 on an outer surface S of the tire 12. Reference character PU represents the boundary between the edge portion 46 and the sidewall 16 on the outer surface S of the tire 12.

In the tire 12, the edge portion 46 is provided at each side of the tread main body 44, but the edge portion 46 may be provided only at one side of the tread main body 44. In this case, the tire 12 is mounted on a vehicle such that the edge portion 46 is located outward in the width direction of the vehicle.

The edge portion 46 includes an outer body 48, an inner body 50, and a connection body 52. The outer body 48 forms a part of the outer surface S of the tire 12. The outer body 48 is formed so as to have a substantially uniform thickness from an outer portion (boundary PS side) thereof to an inner portion (boundary PU side) thereof. The inner body 50 is located between the sidewall 16 and the cushion layer 24. The inner body 50 is located outward of the outer body 48 in the axial direction. The inner body 50 is located inward of the outer body 48 in the radial direction. The inner body 50 is tapered inward. The connection body 52 connects the inner portion of the outer body 48 and an outer portion of the inner body 50. The connection body 52 is formed so as to have a substantially uniform thickness from an outer portion (outer body 48 side) thereof to an inner portion (inner body 50 side) thereof, and has a thickness that is smaller than that of the outer body 48 and substantially equal to that of the outer portion (connection body 52 side) of the inner body 50.

The outer surface S of the tire 12 includes a tread surface ST, a pair of shoulder surfaces SH, and a pair of side surfaces SW. Each shoulder surface SH is connected to an end of the tread surface ST. The shoulder surface SH is located axially outward of the tread surface ST. Each side surface SW is connected to an end of the shoulder surface SH. The side surface SW is located radially inward of the shoulder surface SH.

In FIG. 2, reference character PB1 represents the boundary between the tread surface ST and the shoulder surface SH. In the tire 12, the boundary PB1 is located axially inward of the above-described boundary PS between the tread main body 44 and the edge portion 46. The boundary PB1 may be located outward of the boundary PS in the axial direction, or may coincide with the boundary PS in the axial direction.

In FIG. 2, reference character PB2 represents the boundary between the shoulder surface SH and the side surface SW. In the tire 12, the boundary PB2 coincides with the above-described boundary PU between the edge portion 46 and the sidewall 16. The boundary PB2 may be located outward of the boundary PU in the radial direction, or may be located inward of the boundary PU in the radial direction.

In the tire 12, the contour of the outer surface S, which includes the tread surface ST, the pair of shoulder surfaces SH, and the pair of side surfaces SW, and the positions, dimensions, etc., of members specified in association with the contour are specified in a state where the tire 12 is mounted on a normal rim and inflated with air to adjust the internal pressure of the tire 12 to 50 kPa. In this specification, no load is applied to the tire 12.

In the cross-section shown in FIG. 2, the contour of the tread surface ST is represented by one circular arc having a center on the equator plane CL. In the tire 12, among circular arcs that represent the contour of the tread surface ST, the circular arc having a center on the equator plane CL is referred to as a reference circular arc. The contour of the tread surface ST includes the reference circular arc. In FIG. 2, an arrow RD represents the radius of the reference circular arc. In the tire 12, the radius RD of the reference circular arc is set in the range of 400 mm or greater and 700 mm or less.

In the tire 12, the contour of the tread surface ST may be represented by a plurality of circular arcs aligned in the axial direction. In this case, one circular arc and a circular arc located adjacent to the one circular arc are drawn so as to be tangent to each other at the boundary between both circular arcs.

The contour of the shoulder surface SH is represented by one circular arc having a center at the inner side. The circular arc is tangent to a circular arc located axially inward of this circular arc (the above-described reference circular arc in the tire 12) at the boundary PB1. The boundary PB1 is the tangent point between the circular arc representing the contour of the shoulder surface SH (hereinafter, also referred to as shoulder circular arc) and the reference circular arc. In FIG. 2, an arrow RE represents the radius of the shoulder circular arc.

Although not described in detail, the contour of the side surface SW is also represented by a plurality of circular arcs in the tire 12. The configurations of these circular arcs are determined as appropriate according to the specifications of the side surface of the tire 12. In the tire 12, the contour of an outer portion in the radial direction of the side surface SW is represented by a circular arc having a center at the outer side. This circular arc is tangent to the shoulder circular arc at the boundary PB2.

In FIG. 2, reference character PE represents a virtual tread end. The virtual tread end is specified by the point of intersection of a tangent line tangent to the tread surface ST at the boundary PB1 and a tangent line tangent to the side surface SW at the boundary PB2.

In the tire 12, each of the tread main body 44 and the edge portions 46, which form the tread 14, is formed from a crosslinked rubber. The tread main body 44 is formed from a crosslinked rubber generally used as a crosslinked rubber forming the tread 14 of the tire 12. For each edge portion 46, in particular, a wear resistance index is taken into consideration, and the edge portion 46 is formed from a crosslinked rubber having a wear resistance index higher than that of the tread main body 44. Although not described in detail, the wear resistance index is controlled by the crosslinked rubber, specifically, by adjusting the blending formula of a rubber composition for the crosslinked rubber.

Here, the wear resistance index is an index of wear resistance obtained according to the improved Lambourn test specified in JIS K6264-2. A material having a high wear resistance index has excellent wear resistance. The wear resistance index is obtained, for example, using an improved Lambourn abrasion tester manufactured by Iwamoto Seisakusho. In the tire 12, the conditions for obtaining the wear resistance index are as follows.

Surface speed of test piece=40 m/min
Slip rate=20%
Applied force=15 N
Falling amount of dusting agent=20 g per minute
Test time=4 minutes In the tire 12, a wear resistance index ARe of the edge portion 46 is higher than a wear resistance index ARm of the tread main body 44. The shoulder surface SH forming the boundary portion between the tread surface ST and the side surface SW includes an outer surface formed by the edge portion 46 having the high wear resistance index ARe, and the contour of the shoulder surface SH is represented by a circular arc having a center at the inner side.

In the tire 12, the edge portion 46 has excellent wear resistance, and the shoulder surface SH effectively relieves lateral force. Thus, occurrence of wear at a portion including the shoulder surface SH, that is, at a shoulder portion, is effectively suppressed. In particular, when the tire 12 is applied to the spread trailer 2b, specifically, when the tire 12 is mounted to an axle such that the edge portion 46 is located outside in the width direction of the vehicle, occurrence of hangnail-like wear, occurrence of which is a concern in tires located outside in the width direction of the vehicle among tires mounted on the front axle, is effectively suppressed. In the tire 12, improvement of wear resistance is achieved.

As shown in FIG. 2, in the tire 12, the boundary PS between the tread main body 44 and the edge portion 46 is located inward of the end of the first reference layer 40 in the axial direction. In the tire 12, a sufficient region for the edge portion 46 in the shoulder portion is ensured. In the tire 12, the edge portion 46 effectively contributes to improvement of wear resistance. From this viewpoint, in the tire 12, the boundary PS between the tread main body 44 and the edge portion 46 on the outer surface S of the tire 12 is preferably located inward of the end of the first reference layer 40 in the axial direction.

In FIG. 2, a broken line L1 is an extension line of the outer surface of the first reference layer 40. The extension line L1 is a straight line and is tangent to a line representing the contour of the outer surface of the first reference layer 40, at an end of the outer surface of the first reference layer 40. Reference character PL1 represents the point of intersection of the extension line L1 and the outer surface S of the tire 12. The point of intersection PL1 is a reference position of the first reference layer 40 on the outer surface S of the tire 12. In the tire 12, an inner portion in the radial direction with respect to the reference position PL1 of the first reference layer 40 is a region compressed by action of a load (hereinafter, also referred to as a compressive strain region).

In the tire 12, the extension line L1 of the outer surface of the first reference layer 40 intersects the outer surface of the sidewall 16. In other words, the boundary PU between the edge portion 46 and the sidewall 16 is located outward of the reference position PL1 of the first reference layer 40 in the radial direction. In the tire 12, since the boundary PU is located radially outward of the above-described compressive strain region, occurrence of a crack starting from the boundary PU is suppressed. From this viewpoint, in the tire 12, the extension line L1 of the outer surface of the first reference layer 40 preferably intersects the outer surface of the sidewall 16. In addition, from the viewpoint of achieving improvement of wear resistance while suppressing occurrence of a crack, more preferably, the boundary PS between the tread main body 44 and the edge portion 46 on the outer surface S of the tire 12 is located inward of the end of the first reference layer 40 in the axial direction, and the extension line L1 of the outer surface of the first reference layer 40 intersects the outer surface of the sidewall 16.

In FIG. 2, a double-headed arrow HTW represents the distance in the axial direction from the equator plane CL to the virtual tread end PE. The distance HTW is the half width of the tread 14. A double-headed arrow T represents the thickness of the edge portion 46 at the shoulder surface SH. The thickness T is measured along a line normal to the shoulder surface SH.

In the tire 12, the thickness T of the edge portion 46 at the shoulder surface SH is preferably not less than 4%, and preferably not greater than 8%, of the half width HTW of the tread 14. When the thickness T is set to be not less than 4% of the half width HTW of the tread 14, the stiffness of the edge portion 46 is ensured. In the tire 12, the edge portion 46 contributes to improvement of wear resistance. When the thickness T is set to be not greater than 8% of the half width HTW of the tread 14, the edge portion 46 has an appropriate size, and thus concentration of strain on the end of the belt 22 is suppressed. In the tire 12, good durability is maintained.

As shown in FIG. 2, in the tire 12, the boundary PB1 between the tread surface ST and the shoulder surface SH is located inward of the end of the third layer 38C, that is, the second reference layer 42, in the axial direction. In the tire 12, a sufficient length of the second reference layer 42 is ensured. The second reference layer 42 effectively restricts movement of the shoulder land portion 30s, and thus occurrence of stepped wear is suppressed. In the tire 12, improvement of wear resistance is achieved while occurrence of uneven wear is effectively suppressed. From this viewpoint, in the tire 12, the boundary PB1 between the tread surface ST and the shoulder surface SH is preferably located inward of the end of the second reference layer 42 in the axial direction.

In the tire 12, the ratio of the radius RE of the shoulder circular arc representing the contour of the shoulder surface SH, to the radius RD of the reference circular arc included in the contour of the tread surface ST, is preferably not less than 1/30 and preferably not greater than 1/15. When this ratio is set to be not less than 1/30, appropriate stiffness of the shoulder land portion 30s is ensured, and thus movement of the shoulder land portion 30s is effectively suppressed. In the tire 12, occurrence of stepped wear is suppressed. From this viewpoint, this ratio is more preferably not less than 1/25. When this ratio is set to be not greater than 1/15, a circumferential length difference in the shoulder land portion 30s is appropriately maintained. A difference in slipping on a road surface is less likely to occur between portions of the shoulder land portion 30s, and thus occurrence of shoulder wear is suppressed in the tire 12.

In FIG. 2, a double-headed arrow WS represents the distance in the axial direction from the virtual tread end PE to the inner edge of the shoulder land portion 30s. In the tire 12, the distance WS is the width in the axial direction of the shoulder land portion 30s. Reference character PM represents a center of the shoulder land portion 30s. The center PM is represented by the position, on the outer surface of the shoulder land portion 30s, at which the distance in the axial direction from the inner edge is half the width WS in the axial direction.

As shown in FIG. 2, in the tire 12, the end of the second reference layer 42 is located outward of the center PM of the shoulder land portion 30s in the axial direction. In the tire 12, a sufficient length of the second reference layer 42 is ensured. The second reference layer 42 effectively restricts movement of the shoulder land portion 30s, and thus occurrence of stepped wear is suppressed. In the tire 12, improvement of wear resistance is achieved while occurrence of uneven wear is effectively suppressed. From this viewpoint, in the tire 12, the end of the second reference layer 42 is preferably located outward of the center PM of the shoulder land portion 30s in the axial direction.

In the tire 12, the edge portion 46 has a wear resistance index ARe higher than the wear resistance index ARm of the tread main body 44. The edge portion 46 effectively suppresses occurrence of hangnail-like wear. From the viewpoint of improvement of wear resistance, the ratio of the wear resistance index ARe of the edge portion 46 to the wear resistance index ARm of the tread main body 44 is preferably not less than 150%. From the viewpoint of appropriately maintaining the stiffness difference between the edge portion 46 and the tread main body 44 and the stiffness difference between the edge portion 46 and the sidewall 16 and effectively suppressing occurrence of a crack at an interface based on each of these stiffness differences, this ratio is preferably not greater than 200% and more preferably not greater than 180%.

In FIG. 2, an arrow WT represents the width in the axial direction of the tread 14. The width WT in the axial direction is represented by the distance in the axial direction from one virtual tread end PE of the tread 14 to another virtual tread end PE of the tread 14. An arrow W1 represents the width in the axial direction of the second layer 38B as the first reference layer 40. The width W1 in the axial direction is represented by the distance in the axial direction from one end of the second layer 38B to another end of the second layer 38B. An arrow W2 represents the width in the axial direction of the third layer 38C as the second reference layer 42. The width W2 in the axial direction is represented by the distance in the axial direction from one end of the third layer 38C to another end of the third layer 38C.

In the tire 12, the ratio of the width W1 in the axial direction of the first reference layer 40 to the width WT in the axial direction of the tread 14 is preferably not less than 0.85 and preferably not greater than 0.95.

When the ratio of the width W1 in the axial direction of the first reference layer 40 to the width WT in the axial direction of the tread 14 is set to be not less than 0.85, the belt 22 sufficiently holds the entirety of the tread 14. Peculiar dimensional growth in the outer portion of the shoulder land portion 30s is suppressed, and thus occurrence of shoulder wear is suppressed. When this ratio is set to be not greater than 0.95, concentration of strain on the end of the belt 22 is suppressed, and thus occurrence of damage such as looseness is prevented. Furthermore, since the holding force of the belt 22 to the shoulder land portion 30s is appropriately maintained, slipping of the shoulder land portion 30s on a road surface is suppressed. In the tire 12, occurrence of stepped wear is suppressed.

In the tire 12, the ratio of the width W2 in the axial direction of the second reference layer 42 to the width WT in the axial direction of the tread 14 is preferably not less than 0.75 and preferably not greater than 0.85.

When the ratio of the width W2 in the axial direction of the second reference layer 42 to the width WT in the axial direction of the tread 14 is set to be not less than 0.75, the belt 22 sufficiently holds the entirety of the tread 14. Peculiar dimensional growth in the outer portion of the shoulder land portion 30s is suppressed, and thus occurrence of shoulder wear is suppressed. When this ratio is set to be not greater than 0.85, the holding force of the belt 22 to the shoulder land portion 30s is appropriately maintained. Slipping of the shoulder land portion 30s on a road surface is suppressed, and thus occurrence of stepped wear is suppressed.

As described above, in the tire 12, the end of the second reference layer 42 is located inward of the end of the first reference layer 40 in the axial direction. Since the end of the second reference layer 42 and the end of the first reference layer 40 do not coincide with each other in the axial direction, concentration of strain on the end portion of the belt 22 is prevented. In the tire 12, damage such as looseness is less likely to occur at the end portion of the belt 22. From this viewpoint, the distance in the axial direction from the end of the first reference layer 40 to the end of the second reference layer 42 is preferably not less than 3 mm. From the viewpoint of appropriately maintaining the holding force of the belt 22 to the shoulder land portion 30s and suppressing slipping of the shoulder land portion 30s on a road surface thereby effectively suppressing occurrence of stepped wear, the distance in the axial direction from the end of the first reference layer 40 to the end of the second reference layer 42 is preferably not greater than 8 mm.

There is a concern that hangnail-like wear, which is a concern in conventional tires for a towed vehicle, may occur not only at the shoulder portion but also at an outer edge portion of the middle land portion 30m. Next, a technology to suppress occurrence of hangnail-like wear at the middle land portion 30m will be described.

Figure 3:
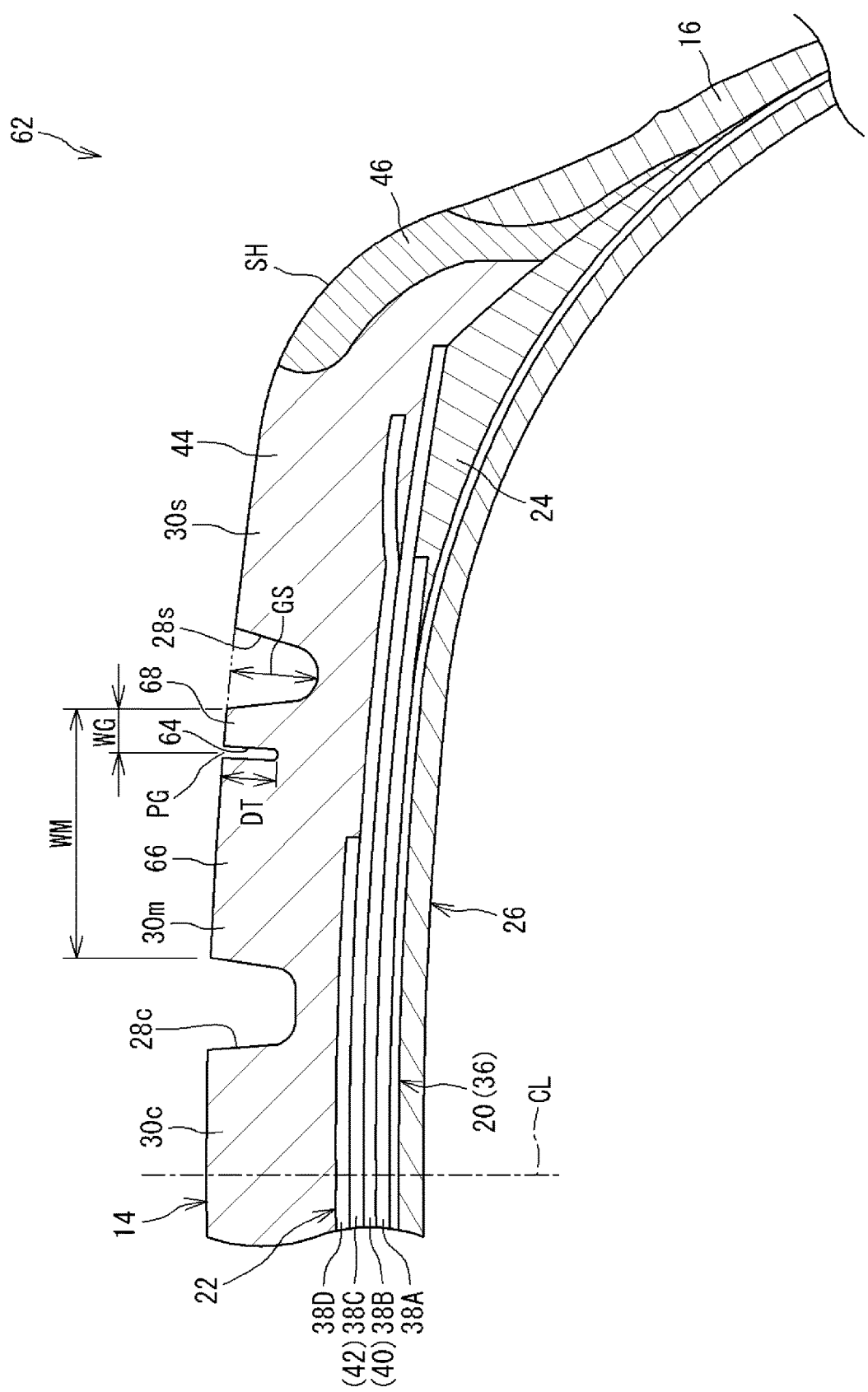
FIG. 3 is a cross-sectional view showing a part of a heavy duty pneumatic tire according to another embodiment of the present invention.

FIG. 3 shows a part of a heavy duty pneumatic tire 62 (hereinafter, sometimes referred to simply as "tire 62") according to another embodiment of the present invention. FIG. 3 shows a part of a cross-section of the tire 62 along a plane including the rotation axis of the tire 62.

FIG. 3 shows a tread 14 portion of the tire 62. In FIG. 3, the right-left direction is the axial direction of the tire 62, and the up-down direction is the radial direction of the tire 62. The direction perpendicular to the surface of the sheet of FIG. 3 is the circumferential direction of the tire 62.

FIG. 3 shows a modification of the middle land portion 30m formed in the tread 14 of the tire 12 shown in FIG. 1. The tire 62 has the same configuration as the tire 12 shown in FIG. 1, except that a circumferential narrow groove 64 is formed on the middle land portion 30m. In FIG. 3, members that are the same as the members of the tire 12 shown in FIG. 1 are designated by the same reference characters, and the description thereof is omitted.

In the tire 62 as well, similar to the tire 12 shown in FIG. 1, the edge portion 46 has excellent wear resistance, and the shoulder surface SH effectively relieves lateral force. Thus, occurrence of wear at a shoulder portion is effectively suppressed. In particular, when the tire 62 is applied to the spread trailer 2b, specifically, when the tire 62 is mounted to an axle such that the edge portion 46 is located outside in the width direction of the vehicle, occurrence of hangnail-like wear, occurrence of which is a concern in tires located outside in the width direction of the vehicle among tires mounted on the front axle, is effectively suppressed. In the tire 62, improvement of wear resistance is achieved.

As shown in FIG. 3, in the tire 62, the circumferential narrow groove 64 is formed on an outer portion in the axial direction of the middle land portion 30m. Accordingly, a middle land portion main body 66 and a narrow land portion 68 located axially outward of the middle land portion main body 66 are formed in the middle land portion 30m. The narrow land portion 68 includes the outer edge of the middle land portion 30m.

In the tire 62, since the circumferential narrow groove 64 is formed on the middle land portion 30m, when lateral force acts on the middle land portion 30m, the outer portion in the axial direction of the middle land portion 30m (the narrow land portion 68 in the middle land portion 30m) effectively deforms as compared to that of a middle land portion having no circumferential narrow groove 64 formed thereon. Due to the deformation, the lateral force that acts on the middle land portion 30m is relieved, and thus, occurrence of hangnail-like wear or the like is suppressed. The circumferential narrow groove 64 contributes to further improvement of wear resistance.

In FIG. 3, a double-headed arrow WM represents the width in the axial direction of the middle land portion 30m. The width WM in the axial direction is represented by the distance in the axial direction from the outer edge of the middle land portion 30m to the inner edge of the middle land portion 30m. Reference character PG represents a center of the circumferential narrow groove 64. The center PG is represented by the center of the length from one edge of the circumferential narrow groove 64 to another edge of the circumferential narrow groove 64, that is, the center of the width of the circumferential narrow groove 64. A double-headed arrow WG represents the distance in the axial direction from the outer edge of the middle land portion 30m to the center PG.

In the tire 62, the distance WG in the axial direction from the outer edge of the middle land portion 30m to the center PG of the circumferential narrow groove 64 is preferably not less than 10%, and preferably not greater than 20%, of the width WM in the axial direction of the middle land portion 30m. When the ratio of the distance WG in the axial direction to the width WM in the axial direction is set to be not less than 10%, the stiffness of the narrow land portion 68 is ensured, and thus peeling of the narrow land portion 68 is prevented. The narrow land portion 68 effectively relieves lateral force, and thus occurrence of hangnail-like wear or the like is suppressed. The narrow land portion 68 contributes to further improvement of wear resistance. From this viewpoint, this ratio is more preferably not less than 12%. When this ratio is set to be not greater than 20%, the circumferential narrow groove 64 is disposed at an appropriate position. In the tire 62, occurrence of wear starting from the circumferential narrow groove 64 is suppressed. From this viewpoint, this ratio is more preferably not greater than 18%.

In the tire 62, the width of the circumferential narrow groove 64 is preferably not less than 3%, and preferably not greater than 6%, of the width WM in the axial direction of the middle land portion 30m. When the ratio of the width of the circumferential narrow groove 64 to the width WM in the axial direction of the middle land portion 30m is set to be not less than 3%, the circumferential narrow groove 64 effectively contributes to relief of lateral force. Since occurrence of hangnail-like wear or the like at the outer portion of the middle land portion 30m is suppressed, improvement of wear resistance is achieved. When this ratio is set to be not greater than 6%, occurrence of wear starting from the circumferential narrow groove 64 is suppressed.

In FIG. 3, a double-headed arrow GS represents the depth of the shoulder circumferential groove 28s. A double-headed arrow DT represents the depth of the circumferential narrow groove 64.

In the tire 62, the depth DT of the circumferential narrow groove 64 is preferably not less than 40%, and preferably not greater than 80%, of the depth GS of the shoulder circumferential groove 28s. When the ratio of the depth DT of the circumferential narrow groove 64 to the depth GS of the shoulder circumferential groove 28s is set to be not less than 40%, the circumferential narrow groove 64 effectively contributes to relief of lateral force. Since occurrence of hangnail-like wear or the like at the outer portion of the middle land portion 30m is suppressed, improvement of wear resistance is achieved. From this viewpoint, this ratio is more preferably not less than 50%. When this ratio is set to be not greater than 80%, peeling of the narrow land portion 68 is prevented. In this case as well, occurrence of hangnail-like wear or the like at the outer portion of the middle land portion 30m is suppressed, and thus improvement of wear resistance is achieved. From this viewpoint, this ratio is more preferably not greater than 70%.

Figure 4:
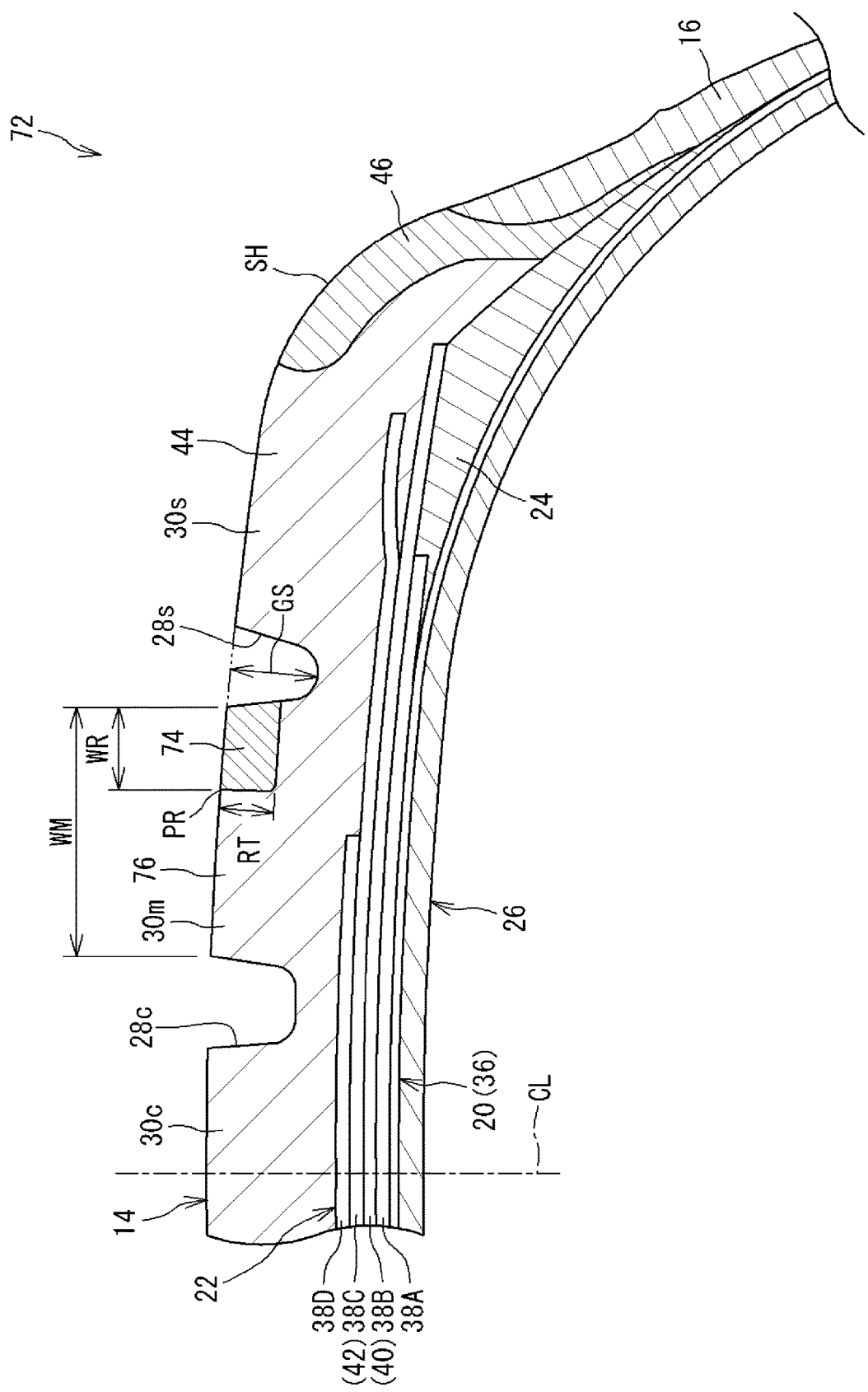
FIG. 4 is a cross-sectional view showing a part of a heavy duty pneumatic tire according to still another embodiment of the present invention.
Figure 5:
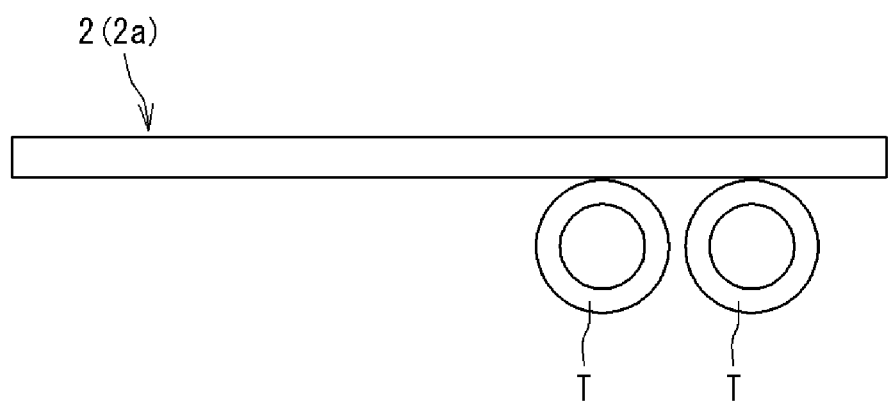
FIG. 5 shows schematic diagrams each showing the outline of a trailer.
Figure 5:
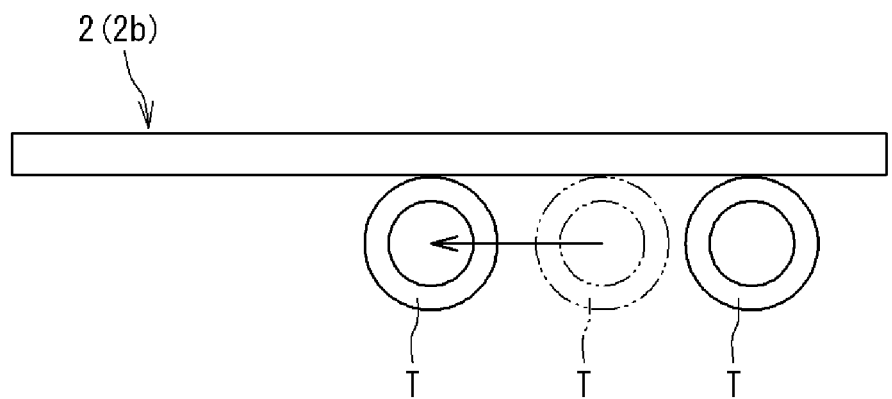

FIG. 4 shows a part of a heavy duty pneumatic tire 72 (hereinafter, sometimes referred to simply as "tire 72") according to still another embodiment of the present invention. FIG. 4 shows a part of a cross-section of the tire 72 along a plane including the rotation axis of the tire 72.

FIG. 4 shows a tread 14 portion of the tire 72. In FIG. 4, the right-left direction is the axial direction of the tire 72, and the up-down direction is the radial direction of the tire 72. The direction perpendicular to the surface of the sheet of FIG. 4 is the circumferential direction of the tire 72.

FIG. 4 shows a modification of the middle land portion 30m formed in the tread 14 of the tire 12 shown in FIG. 1. The tire 72 has the same configuration as the tire 12 shown in FIG. 1, except that a reinforcement portion 74 is provided in the middle land portion 30m. In FIG. 4, members that are the same as the members of the tire 12 shown in FIG. 1 are designated by the same reference characters, and the description thereof is omitted.

In the tire 72 as well, similar to the tire 12 shown in FIG. 1, the edge portion 46 has excellent wear resistance, and the shoulder surface SH effectively relieves lateral force. Thus, occurrence of wear at a shoulder portion is effectively suppressed. In particular, when the tire 72 is applied to the spread trailer 2b, specifically, when the tire 72 is mounted to an axle such that the edge portion 46 is located outside in the width direction of the vehicle, occurrence of hangnail-like wear, occurrence of which is a concern in tires located outside in the width direction of the vehicle among tires mounted on the front axle, is effectively suppressed. In the tire 72, improvement of wear resistance is achieved.

The middle land portion 30m of the tire 72 is composed of the above-described reinforcement portion 74 and a middle land portion main body 76. The middle land portion 30m includes the middle land portion main body 76 and the reinforcement portion 74. In the cross-section of the tire 72 shown in FIG. 4, the shape of the reinforcement portion 74 is a rectangular shape.

As shown in FIG. 4, in the middle land portion 30m, the reinforcement portion 74 is stacked on the middle land portion main body 76 and includes the outer edge of the middle land portion 30m. The reinforcement portion 74 is disposed at the outer portion in the axial direction of the middle land portion 30m.

In the tire 72, the middle land portion main body 76 is formed from the same material as that of the tread main body 44. The middle land portion main body 76 is a part of the tread main body 44. The reinforcement portion 74 is formed from the same material as that of the edge portion 46. Therefore, in the tire 72, the wear resistance index of the reinforcement portion 74 obtained according to JIS K6264-2 is equal to the wear resistance index of the edge portion 46. In the tire 72, since the reinforcement portion 74 is provided at the outer portion in the axial direction of the middle land portion 30m, when lateral force acts on the middle land portion 30m, the reinforcement portion 74 effectively suppresses occurrence of hangnail-like wear or the like. The reinforcement portion 74 contributes to further improvement of wear resistance.

In FIG. 4, a double-headed arrow WM represents the width in the axial direction of the middle land portion 30m. Reference character PR represents the boundary between the middle land portion main body 76 and the reinforcement portion 74 on the outer surface of the middle land portion 30m. A double-headed arrow WR represents the distance in the axial direction from the outer edge of the middle land portion 30m to the boundary PR. The distance WR in the axial direction is the width in the axial direction of the reinforcement portion 74.

In the tire 72, the ratio of the width WR in the axial direction of the reinforcement portion 74 to the width WM in the axial direction of the middle land portion 30m is preferably not less than 1/4 and preferably not greater than 1/2. When this ratio is set to be not less than 1/4, the region for the reinforcement portion 74 in the middle land portion 30m is appropriately ensured. The reinforcement portion 74 effectively suppresses occurrence of hangnail-like wear or the like, and thus further improvement of wear resistance is achieved in the tire 72. From this viewpoint, this ratio is more preferably not less than 1/3. When this ratio is set to be not greater than 1/2, the stiffness of the middle land portion 30m and the stiffness of the shoulder land portion 30s are well balanced. In the tire 72, occurrence of uneven wear such as stepped wear and shoulder wear is effectively suppressed. From this viewpoint, this ratio is more preferably not greater than 2/5.

In FIG. 4, a double-headed arrow GS represents the depth of the shoulder circumferential groove 28s. A double-headed arrow RT represents the thickness of the reinforcement portion 74.

In the tire 72, the thickness RT of the reinforcement portion 74 is preferably not less than 40%, and preferably not greater than 80%, of the depth GS of the shoulder circumferential groove 28s. When the ratio of the thickness RT of the reinforcement portion 74 to the depth GS of the shoulder circumferential groove 28s is set to be not less than 40%, peeling between the reinforcement portion 74 and the middle land portion main body 76, that is, the tread main body 44, is suppressed. The reinforcement portion 74 effectively suppresses occurrence of hangnail-like wear or the like, and thus further improvement of wear resistance is achieved in the tire 72. From this viewpoint, this ratio is more preferably not less than 50%. When this ratio is set to be not greater than 80%, occurrence of a crack at the boundary between the wall and the bottom of the shoulder circumferential groove 28s is suppressed. In this case as well, the reinforcement portion 74 effectively suppresses occurrence of hangnail-like wear or the like. In the tire 72, further improvement of wear resistance is achieved. From this viewpoint, this ratio is more preferably not greater than 70%.

As is obvious from the above description, according to the present invention, the heavy duty pneumatic tires 12, 62, and 72 in which improvement of wear resistance is achieved are obtained. In particular, when the tires 12, 62, and 72 are applied to the spread trailer 2b, occurrence of hangnail-like wear, occurrence of which is a concern in tires located outward in the width direction of the vehicle among the tires mounted on the front axle, is effectively suppressed.

The embodiments disclosed above are merely illustrative in all aspects and are not restrictive. The technical scope of the present invention is not limited to the above-described embodiments, and all changes which come within the range of equivalency of the configurations recited in the claims are therefore intended to be included therein.

EXAMPLES

The following will describe the present invention in further detail by means of examples, etc., but the present invention is not limited to these examples.

Example 1

A heavy duty pneumatic tire (tire size=295/75R22.5) having the basic structure shown in FIG. 1 and FIG. 2 and having specifications shown in Table 1 below was obtained.

In Example 1, the ratio (ARe/ARm) of the wear resistance index ARe of the edge portion to the wear resistance index ARm of the tread main body was 180%. The boundary PS of the tread main body and the edge portion was located inward of the end of the first reference layer in the axial direction. This is represented as "IN" in the cell for "PS" in Table 1. The boundary PU between the edge portion and the sidewall was located outward of the reference position PL1 of the first reference layer in the radial direction. This is represented as "OUT" in the cell for "PU" in Table 1.

In Example 1, the ratio (T/HTW) of the thickness T of the edge portion at the shoulder surface SH to the tread half width HTW was set to 6%. The ratio (RE/RD) of the radius RE of the shoulder circular arc to the radius RD of the reference circular arc was set to 1/20. The boundary PB1 between the tread surface ST and the shoulder surface SH was located inward of the end of the second reference layer in the axial direction. This is represented as "IN" in the cell for "PB1" in Table 1.

Comparative Example 1

A tire of Comparative Example 1 was obtained in the same manner as Example 1, except that the radius RE was changed such that the ratio (RE/RD) was as shown in Table 1 below, the boundary PB1 between the tread surface ST and the shoulder surface SH was located axially outward of the end of the second reference layer, and no edge portions were provided in the tread. The fact that the boundary PB1 was located axially outward of the end of the second reference layer is represented as "OUT" in the cell for "PB1" in Table 1. The tire of Comparative Example 1 is a conventional tire.

Example 2

A tire of Example 2 was obtained in the same manner as Example 1, except that the wear resistance index ARe, the thickness T, and the radius RE were changed such that the ratio (ARe/ARm), the ratio (T/HTW), and the ratio (RE/RD) were as shown in Table 1 below, and the boundary PU between the edge portion and the sidewall was located radially inward of the reference position PL1 of the first reference layer. The fact that the boundary PU was located radially inward of the reference position PL1 is represented as "IN" in the cell for "PU" in Table 1.

Examples 3 to 5

Tires of Examples 3 to 5 were obtained in the same manner as Example 1, except that the wear resistance index ARe and the radius RE were changed such that the ratio (ARe/ARm) and the ratio (RE/RD) were as shown in Table 1 and Table 2 below.

Example 6

A heavy duty pneumatic tire (tire size=295/75R22.5) having the basic structure shown in FIG. 3 and having specifications shown in Table 2 below was obtained.

In Example 6, the heavy duty pneumatic tire has the same configuration as that of Example 1, except that a circumferential narrow groove was provided on the middle land portion of Example 1.

In Example 6, the ratio (WG/WM) of the distance WG in the axial direction from the outer edge of the middle land portion to the center of the circumferential narrow groove, to the width WM in the axial direction of the middle land portion, was set to 15%. The depth DT of the circumferential narrow groove was set to 60% of the depth GS of the shoulder circumferential groove, and the width of the circumferential narrow groove was set to 4% of the width in the axial direction of the middle land portion.

Example 7

A heavy duty pneumatic tire (tire size=295/75R22.5) having the basic structure shown in FIG. 4 and having specifications shown in Table 2 below was obtained.

In Example 7, the heavy duty pneumatic tire has the same configuration as that of Example 1, except that a reinforcement portion was provided in the middle land portion of Example 1. The wear resistance index of the reinforcement portion is equal to the wear resistance index ARe of the edge portion.

In Example 7, the ratio (WR/WM) of the width WR of the reinforcement portion to the width WM in the axial direction of the middle land portion was set to 1/3. The thickness RT of the reinforcement portion was set to 60% of the depth GS of the shoulder circumferential groove.

[Wear Resistance]

The test tires were fitted onto rims (size=22.5×9.00) and inflated with air to adjust the internal pressure of each tire to 900 kPa. The tires were mounted to the front axle of a spread type trailer. The trailer was towed by a towing vehicle, and was caused to run for 6 months without tire rotation. After the running, the appearance of each tire was observed to confirm the wear state. The results are shown in Tables 1 and 2 below.

In the evaluation, the progress of hangnail-like wear at the shoulder portion and the middle land portion was visually confirmed. The case where the progress of wear was slight is represented as "G", the case where the wear had progressed but did not hinder running is represented as "A", and the case where the wear had progressed to the extent that replacement was necessary is represented as "B". In order to quantify the degree of wear at the shoulder portion, an abrasion amount was measured. In the evaluation, a hole (inner diameter=2.0 mm, depth=15.0 mm) was provided in the center portion of the shoulder surface, and the amount of change in the depth of the hole was measured. As the measurement results, the abrasion amount is indicated as an index in Table 1 and Table 2 below. A lower value represents a smaller abrasion amount.

In the evaluation, in addition to the progress of wear, the presence/absence of stepped wear, shoulder wear, and surface roughness represented by abrasion due to side slip was confirmed. The case where occurrence of wear or surface roughness was not confirmed is represented as "N", the case where occurrence of wear or surface roughness was confirmed but did not hinder running is represented as "A", and the case where wear or surface roughness had occurred to the extent that replacement was necessary is represented as "B".

TABLE 1

|  |  | Comparative Example 1 | Example 2 | Example 3 | Example 1 |
|---|---|---|---|---|---|
| Structure |  | — | FIG. 2 | FIG. 2 | FIG. 2 |
| ARe/ARm [%] |  | — | 220 | 200 | 180 |
| PS |  | — | IN | IN | IN |
| PU |  | — | IN | OUT | OUT |
| T/HTW [%] |  | — | 5 | 6 | 6 |
| RE/RD [—] |  | 1/75 | 1/10 | 1/15 | 1/20 |
| PB1 |  | OUT | IN | IN | IN |
| WG/WM [%] |  | — | — | — | — |
| WR/WM [—] |  | — | — | — | — |
| Wear | Abrasion amount | 100 | 25 | 30 | 30 |
|  | Appearance (SH) | B | G | G | G |
|  | Appearance (middle) | B | G | A | A |
| Stepped wear |  | N | N | N | N |
| Shoulder wear |  | N | B | N | N |
| Surface roughness |  | N | B | N | N |

TABLE 2

|  |  | Example 4 | Example 5 | Example 6 | Example 7 |
|---|---|---|---|---|---|
| Structure |  | FIG. 2 | FIG. 2 | FIG. 3 | FIG. 4 |
| ARe/ARm [%] |  | 150 | 150 | 180 | 180 |
| PS |  | IN | IN | IN | IN |
| PU |  | OUT | OUT | OUT | OUT |
| T/HTW [%] |  | 6 | 6 | 6 | 6 |
| RE/RD [—] |  | 1/25 | 1/30 | 1/20 | 1/20 |
| PB1 |  | IN | IN | IN | IN |
| WG/WM [%] |  | — | — | 15 | — |
| WR/WM [—] |  | — | — | — | 1/3 |
| Wear | Abrasion amount | 35 | 60 | 30 | 30 |
|  | Appearance (SH) | G | A | G | G |
|  | Appearance (middle) | A | A | G | G |

TABLE 2-continued

|  | Example 4 | Example 5 | Example 6 | Example 7 |
|---|---|---|---|---|
| Stepped wear | N | A | N | N |
| Shoulder wear | N | N | N | N |
| Surface roughness | N | N | N | N |

As shown in Tables 1 and 2, it is confirmed that improvement of wear resistance is achieved in the Examples. The Examples have better evaluations than the Comparative Examples. From the evaluation results, advantages of the present invention are clear.

INDUSTRIAL APPLICABILITY

The above-described technology for achieving improvement of wear resistance can be applied to various tires.

REFERENCE SIGNS LIST 2, 2a, 2b trailer
12, 62, 72 tire
14 tread
16 sidewall
20 carcass
22 belt
28, 28c, 28s circumferential groove
30, 30c, 30m, 30s land portion
38, 38A, 38B, 38C, 38D layer
40 first reference layer
42 second reference layer
44 tread main body
46 edge portion
64 circumferential narrow groove
66, 76 middle land portion main body
68 narrow land portion
74 reinforcement portion

The invention claimed is:

1. A heavy duty pneumatic tire comprising: a tread that comes into contact with a road surface; a pair of sidewalls connected to the tread; a belt located radially inward of the tread; and a pair of cushion layers located radially inward of axially outer ends of the belt, wherein
each end of the belt is stacked on a corresponding cushion layer of the pair of cushion layers,
at least four circumferential grooves are formed on the tread, thereby forming at least five land portions aligned in an axial direction, and, among these land portions, a land portion located on an equator plane or at the equator plane side is a center land portion, land portions located at outermost sides in the axial direction are shoulder land portions, and land portions located between the center land portion and the shoulder land portions are middle land portions,
the belt includes a plurality of layers stacked in a radial direction, and, among these layers, a layer having a largest width in the axial direction is a first reference layer, and a layer stacked at an outer side of the first reference layer is a second reference layer, each end of the second reference layer being located inward of an end of the first reference layer in the axial direction,
the tread includes a tread main body and edge portions located axially outward of the tread main body,
at least four circumferential grooves are formed on the tread main body, a wear resistance index of each edge portion obtained according to JIS K6264-2 is higher than that of the tread main body, an outer surface of the tire includes a tread surface, a pair of shoulder surfaces connected to the tread surface, and a pair of side surfaces connected to the shoulder surfaces, each shoulder surface includes an outer surface formed by the edge portion, a contour of each shoulder surface is represented by a circular arc having a center at an inner side, the tread main body covers the entirety of the belt, each end of the belt is located between the tread main body and the corresponding cushion layer, and a part of each edge portion is located between a corresponding sidewall of the pair of sidewalls and the corresponding cushion layer.

2. The heavy duty pneumatic tire according to claim 1, wherein a boundary between the tread main body and each edge portion on the outer surface of the tire is located inward of the ends of the first reference layer that is adjacent to the respective boundary between the tread main body and each edge portion in the axial direction, and an extension line of the first reference layer intersects the sidewall.

3. The heavy duty pneumatic tire according to claim 1, wherein a thickness of each edge portion at the shoulder surface is not less than 4% and not greater than 8% of a half width of the tread.

4. The heavy duty pneumatic tire according to claim 1, wherein a boundary between the tread surface and each shoulder surface is located inward of the ends of the second reference layer that is adjacent to the respective boundary between the tread main body and each edge portion in the axial direction.

5. The heavy duty pneumatic tire according to claim 1, wherein a contour of the tread surface includes a circular arc having a center on the equator plane, and the circular arc is a reference circular arc, and a ratio of a radius of the circular arc representing the contour of the shoulder surface, to a radius of the reference circular arc, is not less than 1/30 and not greater than 1/15.

6. The heavy duty pneumatic tire according to claim 1, wherein the ends of the second reference layer are located outward of a center of the shoulder land portion adjacent to the end of the second reference layer in the axial direction.

7. The heavy duty pneumatic tire according to claim 1, wherein a ratio of the wear resistance index of each edge portion to the wear resistance index of the tread main body is not less than 150% and not greater than 200%.

8. The heavy duty pneumatic tire according to claim 1, wherein a circumferential narrow groove is formed on each middle land portion, and a distance in the axial direction from an outer edge of the middle land portion to a center of the circumferential narrow groove formed on the middle land portion is not less than 10% and not greater than 20% of a width in the axial direction of the middle land portion.

9. The heavy duty pneumatic tire according to claim 8, wherein a boundary between the tread main body and each edge portion on the outer surface of the tire is located inward of the end of the first reference layer that is adjacent to the respective boundary between the tread main body and each edge portion in the axial direction, and an extension line of the first reference layer intersects the sidewall.

10. The heavy duty pneumatic tire according to claim 8, wherein a width of each circumferential narrow groove is not less than 3% and not greater than 6% of the width in the axial direction of the middle land portion on which the circumferential narrow groove is formed.

11. The heavy duty pneumatic tire according to claim 8, wherein among the circumferential grooves, circumferential grooves located at outermost sides in the axial direction are shoulder circumferential grooves, and a depth of each circumferential narrow groove is not less than 40% and not greater than 80% of a depth of each shoulder circumferential groove.

12. The heavy duty pneumatic tire according to claim 1, wherein each middle land portion includes a middle land portion main body and a reinforcement portion stacked on the middle land portion main body, each reinforcement portion includes an outer edge of a corresponding middle land portion of the middle land portions, a ratio of a width in the axial direction of each reinforcement portion to a width in the axial direction of each middle land portion is not less than 1/4 and not greater than 1/2, and a wear resistance index of each reinforcement portion obtained according to JIS K6264-2 is equal to that of the edge portion.

13. The heavy duty pneumatic tire according to claim 12, wherein a boundary between the tread main body and each edge portion on the outer surface of the tire is located inward of the end of the first reference layer that is adjacent to the respective boundary between the tread main body and each edge portion in the axial direction, and an extension line of the first reference layer intersects an outer surface of the sidewall.

14. The heavy duty pneumatic tire according to claim 12, wherein among the circumferential grooves, circumferential grooves located at outermost sides in the axial direction are shoulder circumferential grooves, and a thickness of each reinforcement portion is not less than 40% and not greater than 80% of a depth of each shoulder circumferential groove.

15. The heavy duty pneumatic tire according to claim 1, wherein each end of the tread main body is located between a corresponding edge portion of the edge portions and the corresponding cushion layer.

16. The heavy duty pneumatic tire according to claim 1, wherein a boundary between the tread main body and each edge portion on the outer surface of the tire is located outward of the end of the second reference layer that is adjacent to the respective boundary between the tread main body and each edge portion in the axial direction.

* * * * *